Nov. 15, 1960  F. BLOCH  2,960,649
LINE NARROWING GYROMAGNETIC APPARATUS
Filed June 18, 1954  2 Sheets-Sheet 1
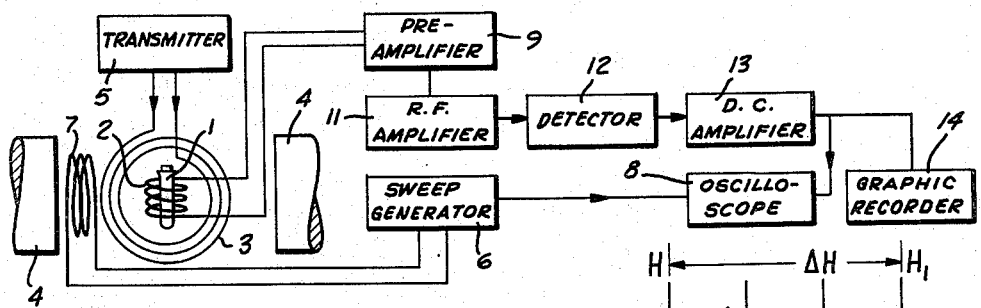
FIG_1
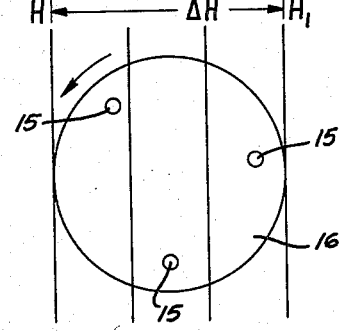
FIG_2
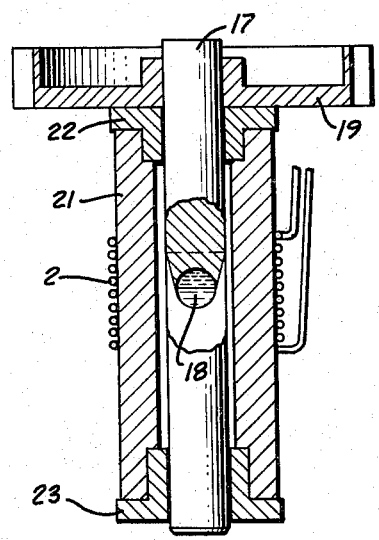
FIG_3
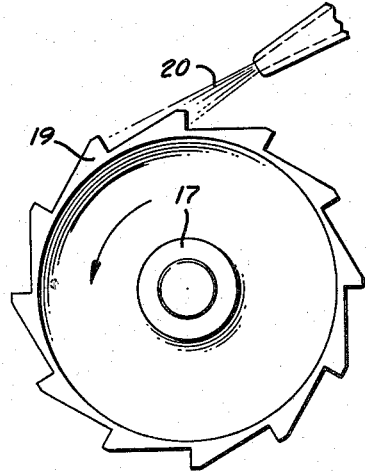
FIG_4
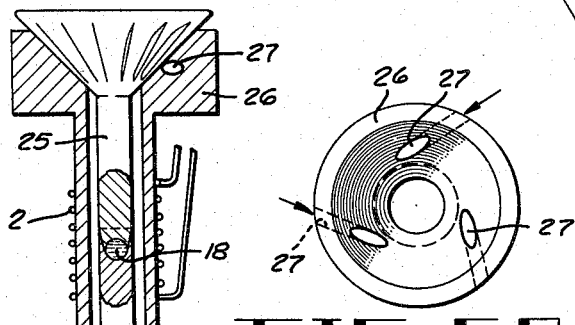
FIG_5          FIG_5A
Felix Bloch
INVENTOR.
BY
Paul B. Hunter
ATTORNEY Nov. 15, 1960     F. BLOCH     2,960,649
LINE NARROWING GYROMAGNETIC APPARATUS
Filed June 18, 1954     2 Sheets-Sheet 2
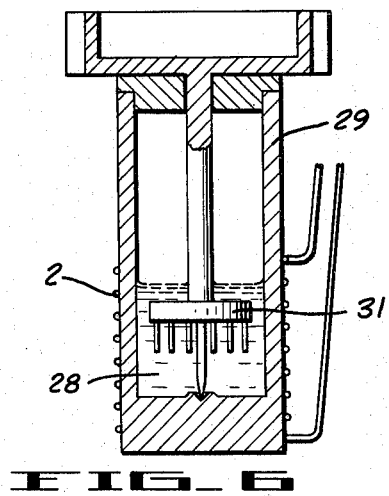
FIG_6
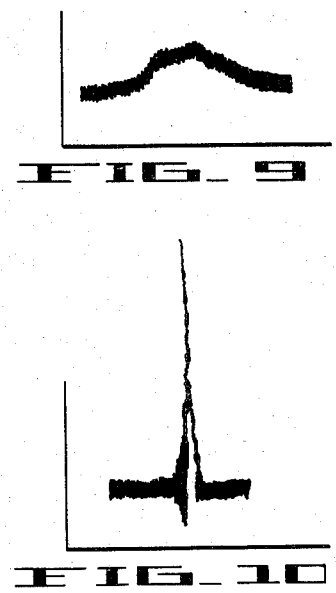
FIG_9
FIG_10
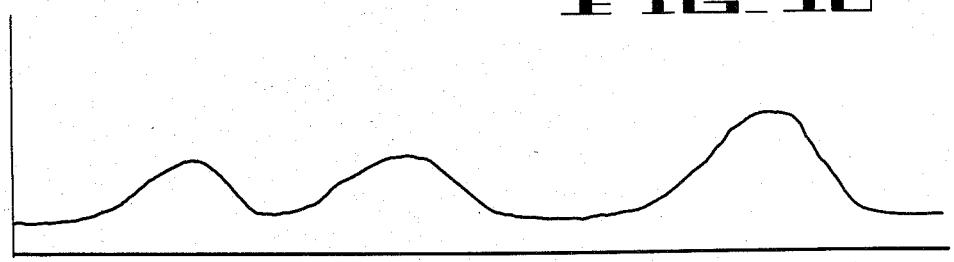
FIG_7
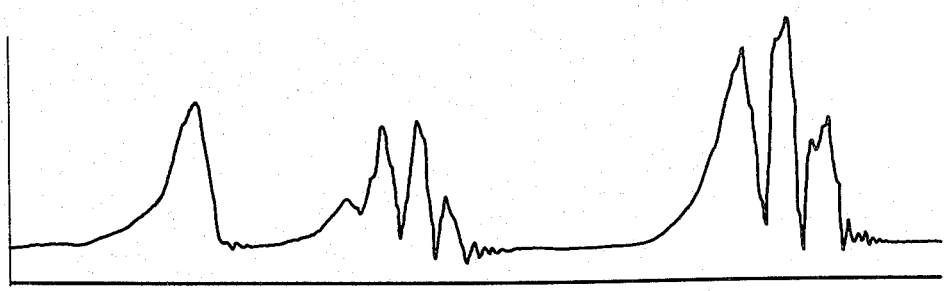
FIG_8
Felix Bloch
INVENTOR.
BY
Paul B. Hunter
ATTORNEY United States Patent Office 2,960,649
Patented Nov. 15, 1960

2,960,649

LINE NARROWING GYROMAGNETIC APPARATUS

Felix Bloch, 1551 Emerson St., Palo Alto, Calif.

Filed June 18, 1954, Ser. No. 437,770

11 Claims. (Cl. 324—.5)

This invention relates in general to gyromagnetic resonance and, more particularly, to an improved method and line narrowing apparatus for utilization therein whereby improved and more sharply defined resonance is obtained.

The present invention is an improvement applicable to the gyromagnetic resonance methods and apparatus set forth in complete detail in United States Patent 2,561,489 entitled "Method and Means for Chemical Analysis by Nuclear Inductions," issued to the present inventor and William W. Hansen on July 24, 1951. This invention is described in two letters to the editor appearing on pages 496 and 497 of the Physical Review, vol. 94, No. 2 of April 15, 1954. To briefly summarize the matter set forth in the above cited patent, a volume of matter which contains portions of atoms, such as, for example, protons or other nuclei, possessing the properties of magnetic moment and gyroscopic moment is positioned in a strong, steady unidirectional magnetic field such as may be produced by a magnet. This strong magnetic field polarizes the atom portions in the direction of the magnetic field. A radio frequency magnetic field is applied to the atom portions at an angle to the polarizing field by means of a transmitter coil. The atom portions precess in the unidirectional magnetic field and produce a rotating magnetic field of the same angular rate as the applied radio frequency. This rotating magnetic field may be detected by a pickup coil positioned normal to both the unidirectional field and the transmitter coil. This rotating magnetic field will be at a maximum strength when the following relationship is met $$\omega = \gamma H$$

where $\omega$ is the angular rate of the applied radio frequency field,
$\gamma$ is the gyromagnetic ratio of the nuclei, and
$H$ is the strength of the unidirectional magnetic field.

In utilization of the above method for chemical analysis, extremely high resolution is often necessary for the studies of narrow lines, chemical shifts and fine structures. A fixed and highly stable radio frequency signal source is employed to provide the driving radio frequency field and an extremely homogeneous polarizing magnetic field is a necessity. For example, the separation between three proton resonance lines of three components of the $CH_3$ group in ethyl alcohol amounts to only 6 cycles per second and requires for its resolution a homogeneity of the polarizing field over the sample region to within about one milligauss. In a typical magnetic field of 7000 gauss this represents a resolution of one part in seven millions which can be achieved by utilization of a precise magnet made with great care.

The object of the present invention is to provide a novel method and line narrowing apparatus whereby the desired high resolution may be obtained with a much less homogeneous magnet or where, if such a precise magnet is already available, the high resolution may be increased by, for example, a factor of at least ten, so that further interesting details may be observed. This present invention introduces the concept of providing a field-averaging motion in the magnetic field of the substance under investigation.

One feature of the present invention is the provision of a novel method and apparatus whereby the gyromagnetic atom portions in the sample are caused to continually and in a repetitive manner move about in the polarizing field, the atom portions responding as if they were exposed all the time to the average value of the magnetic field through which they move.

Another feature of the present invention is the provision of a novel apparatus for rapidly rotating or spinning the sample of matter on a fixed axis in the polarizing magnetic field.

These and other features and advantages of the present invention will become evident upon a perusal of the following specification taken in connection with the accompanying drawings wherein:

Fig. 1 is a block diagram of a high resolution gyromagnetic resonance spectroscopy system in which the present invention may be utilized to greatly increase the sensitivity and resolution thereof, Fig. 2 is a diagrammatic view of a sample or volume of matter containing nuclei shown in an inhomogeneous magnetic field, the sample rotating in the field, Fig. 3 is a longitudinal section view of one embodiment of the novel sample-rotating apparatus of this invention, Fig. 4 is a plan view of the apparatus shown in Fig. 3, Fig. 5 shows another embodiment of the present invention for rotating the sample in the magnetic field, Fig. 5A is a plan view of the coil form 26 shown in Fig. 5, Fig. 6 shows still another embodiment of the present invention which includes a structure for stirring the sample in the polarizing field, Fig. 7 shows a high resolution trace of ethyl alcohol obtained before the sample is rotated in the polarizing field, Fig. 8 shows a high resolution trace of the same sample in the same magnetic field as in Fig. 7 but with the sample rapidly rotating in the field, Fig. 9 shows a high resolution trace of proton resonance from distilled water displayed on the oscilloscope before spinning the water sample, and Fig. 10 shows the high resolution trace of the sample of Fig. 9 while the sample is spinning at a rate of about 25 cycles per second.

Referring now to Fig. 1 there is shown in block diagram form one gyromagnetic resonance system which is of the high resolution spectrometer class which operates at a fixed and highly stable frequency of, for example, 30 mc. The sample 1 which the system is investigating is placed within a probe which includes a receiver coil 2 and a transmitter coil 3 positioned perpendicular to the receiver coil 2. The probe is positioned in a strong magnetic field of about 7000 gauss produced by a magnet represented by the magnet poles 4. A transmitter 5 which includes a fixed frequency and highly stable oscillator, such as a crystal controlled oscillator, and an amplifier circuit provides a suitable source of radio frequency energy to the transmitter coil 3. This radio frequency energy in the transmitter coil produces an alternating field perpendicular to the polarizing magnetic field to thereby cause the nuclei to precess at the particular operating frequency. The sweep generator 6 provides a low frequency voltage to sweep coils 7 in the probe which modulates the polarizing magnetic field to repeatedly sweep through the region of resonance of the nuclei. The sweep generator may be tunable over a range of sweep frequencies, for example, .1 to 30 cycles per second. This signal is also transmitted to the horizontal deflection plates of an oscilloscope 8 to synchronize the oscilloscope with the modulated polarizing field.

The alternating field produced by the precessing nuclei induces a voltage in the receiver coil 2 which is transmitted to a preamplifier 9, another amplifier stage 11 and then to a detector circuit 12 where the high frequency signal is demodulated to give an envelope signal. This signal is transmitted to a D.C. and low audio amplifier 13 where it is amplified and then transmitted to the vertical plates of the oscilloscope 8. A graphic recorder 14 is also shown provided to give a permanent recording in graphic form of the amplitude of the induced energy in the receiver coil.

In such high resolution systems even the best polarizing magnetic fields available are slightly inhomogeneous over the volume occupied by the sample. When the nuclei are sitting motionless in this field, different nuclei will be in different field strengths and therefore will exhibit slightly different resonance characteristics which result in a loss in the sharpness of the high resolution, or a smearing out of the resonance signal.

Shown in Fig. 2 is a schematic drawing showing several nuclei 15 in a volume of matter 16 in the polarizing magnetic field represented by the field lines H to $H_1$, the variation of the field across the sample being $\Delta H$. With the nuclei remaining in the positions in which they are shown in this view, the above stated smearing out of the high resolution curves occurs. However, by providing a motion to the sample such that the nuclei are circulated in the magnetic field, I have vastly improved the resolution of the system. To further explain, the motion I impart to the sample provides that during each time interval of the order $t$, each nucleus is once exposed to the range of variation of $\Delta H$ of the magnetic field. When the nuclei are moving rapidly enough, they react as if they are at all times in a constant field strength which is an average of the field strength across the variation $\Delta H$. The more rapid the motion, i.e., the shorter the interval $t$, the more a nucleus reacts as if it were exposed all the time to the average value of the field. It can be shown that the effect will start to become appreciable if $$t \simeq \frac{2\pi}{\gamma \Delta H}$$

and will improve as $t$ becomes less than, that is, smaller relative to, $$\frac{2\pi}{\gamma \Delta H}$$

As viewed in Fig. 2, the sample 16 is rotated counterclockwise.

It should be noted that the immediately preceding formula implies that every nucleus in the sample experiences the full range of variation $\Delta H$ during the time interval $t$. Generally, however, the averaging process will take place for each nucleus only over those regions of the sample through which it is carried in the course of its motion. As a result there will be a partial narrowing of the line width which, however, can be very appreciable.

Referring to Fig. 3 there is shown in section view a portion of a probe construction which is a preferred embodiment of the present invention. A two-section rod 17 of a suitable material such as plastic is formed such that the junction of the two sections forms a spherical-shaped cavity in which a sample 18 is placed. The rod has an annular air turbine 19 secured near the top thereof, this air turbine being seen in the plan view of Fig. 4. This turbine is plastic and has sawtooth-shaped indents in the outer periphery which catch the air jet 20 to rotate the rod. The rod is placed into a hollow cylindrical receiver coil form 21 which is also made of plastic, the form having bearings 22 and 23 inserted in the ends thereof. In response to the air jet directed against the sawtooth indents in the turbine 19, the rod spins at a rapid rate in the bearings 22 and 23. The receiver coil 2 is wound about the form 21 at the point of the sample 18 and its axis coincides with the axis of revolution of the rod 17. The remainder of the probe structure includes the transmitter coil and the sweep coils.

In one instance of use of this invention, the spherical sample was $3/16$ inch in diameter. The magnetic field was approximately 7000 gauss and the homogeneity was within about $10^{-3}$ gauss over the sample. An appreciable improvement in resolution was noted with a rotational speed of the rod 17 of about 10 cycles or revolutions per second.

Figs. 5 and 5A show another embodiment of the present invention where the sample-holding rod 25 has a conical-shaped upper end which is supported in a conical recess in the form 26. Air stream holes 27 extend through the form 26 and are positioned so that the several air streams are directed against the indents in the conical surface of the rod 25 so as to cause both a rotational and a lifting motion. The rod is thus lifted out of its conical seat during rotation and the bearing friction is thus greatly decreased.

In Fig. 6 there is shown another embodiment where the sample 28 is placed in a hollow coil form 29 into which a turbine driven agitator 31 is also placed. The agitator 31 is rotated within the form member 29 to stir up the sample and thus produce the desired motion of the nuclei.

A comparison between high resolution signals from an ethyl alcohol sample before and during spinning is shown in Figs. 7 and 8. Fig. 7 is a high resolution trace of ethyl alcohol with the sample remaining motionless in the polarizing field. The same sample in the same polarizing field was then rotated rapidly and the vastly improved high resolution resonance signal is shown in Fig. 8.

Referring to Fig. 9 there is shown an oscilloscope trace of a high resolution proton resonance signal from distilled water with the sample remaining motionless. The beam sweep from right to left was made in about thirty seconds. A measure of the polarizing field inhomogeneity is given by the width at half maximum and was found to be $1.7 \times 10^{-3}$ gauss. In Fig. 10 the same sample of distilled water in the same polarizing field was rotated at about 25 cycles per second, all other conditions being identical. It is seen that the rotation of the sample results in a reduction of the half-width by a factor of about 17 and an increase of the maximum height by a factor of about 7.

In the above embodiments, an air jet turbine was utilized to spin the sample in the magnetic field but it should be understood that other manners of continually moving the nuclei about in a repetitive, random manner in the magnetic field may be employed which create wave motions, turbulence, etc. The invention was described with reference to its use in the crossed-coil type of gyromagnetic resonance systems but it should be understood that it is equally applicable to other types of systems such as, for example, the single coil absorption method and also methods involving the free precession of gyromagnetic atom portions in magnetic fields.

Since many modifications and variations may be made in the described method and apparatus without departing from the spirit of the invention, the foregoing description is to be considered as exemplary and not in a limiting sense.

What is claimed is:

1. Apparatus for detecting the gyromagnetic characteristics of a sample located in an external polarizing magnetic field, which field has a variation represented by $\Delta H$ in the region of the sample, comprising means for subjecting the sample to a driving magnetic field of radio frequency at an angle with respect to the polarizing field to cause gyromagnetic resonance of the atom portions of the sample in the polarizing field and for detecting said gyromagnetic resonance signal response to indicate the gyromagnetic resonance characteristics of the sample, and means for increasing the resolution, that is, narrowing the line with, of the signal response by repetitiously moving the sample in the polarizing field simultaneously with the application of the driving radio frequency magnetic field so that during each interval of time $t$ each atom portion is once exposed to a range of variation of the polarizing magnetic field in the sample region equal to $\Delta H$, the speed of movement being such that $t$ is approximately equal to or less than $$\frac{2\pi}{\gamma \Delta H}$$

where $\gamma$ is the gyromagnetic ratio and $\Delta H$ is variation in the field in the region of the sample.

2. Apparatus as claimed in claim 1 wherein said means for moving the sample in the polarizing field comprises means for spinning the sample about an axis substantially perpendicular to the polarizing field.

3. Apparatus as claimed in claim 2 wherein said means for spinning the sample comprises an air turbine coupled to the sample and arranged to be driven by a jet of air.

4. Apparatus as claimed in claim 1 wherein said means for moving the sample comprises means for stirring up the sample.

5. Apparatus for use in narrowing the line width of a nuclear magnetic resonance signal obtained from a nuclear magnetic resonance spectrometer in which a sample of matter with a gyromagnetic ratio $\gamma$ is located in an external polarizing magnetic field, which field has a variation represented by $\Delta H$ in the region of the sample, and in which a driving magnetic field of radio frequency is applied to the sample substantially normal to the polarizing magnetic field to produce a nuclear magnetic resonance signal response which indicates the nuclear resonance characteristics of the sample comprising means for rapidly moving the sample about in the external polarizing magnetic field, while maintaining the sample in the polarizing field, simultaneously with the application of the driving magnetic field so that the line width of the resonance signal is narrowed, the sample moving at a rate such that the time $t$ that each nuclei is once exposed to a range of variation of the polarizing magnetic field in the sample region equal to $\Delta H$ is approximately equal to or less than $$\frac{2\pi}{\gamma \Delta H}$$

6. Apparatus as claimed in claim 5 wherein said means for rapidly moving the sample about in the external polarizing magnetic field comprises means for spinning the sample about an axis substantially perpendicular to the polarizing field.

7. Apparatus as claimed in claim 6 wherein said means for spinning the sample comprises an air turbine coupled to the sample and arranged to be driven by a jet of air.

8. Apparatus as claimed in claim 5 wherein said means for rapidly moving the sample about in the external polarizing magnetic field comprises means for stirring the sample.

9. The method of narrowing the line width of a nuclear magnetic resonance signal obtained from a nuclear magnetic resonance spectrometer in which a sample of matter with a gyromagnetic ratio $\gamma$ is located in an external polarizing magnetic field, which field has a variation represented by $\Delta H$ in the region of the sample, and in which a driving magnetic field of radio frequency is applied to the sample substantially normal to the polarizing magnetic field to produce a nuclear magnetic resonance signal response which indicates the nuclear resonance characteristics of the sample comprising the step of rapidly moving the sample about in the external polarizing magnetic field, while maintaining the sample in the polarizing field, simultaneously with the application of the driving magnetic field so that the line width of the resonance signal is narrowed, the sample moving at a rate such that the time $t$ that each nuclei is once exposed to a range of variation of the polarizing magnetic field in the sample region equal to $\Delta H$ is approximately equal to or less than $$\frac{2\pi}{\gamma \Delta H}$$

10. The method as claimed in claim 9 wherein the step of rapidly moving the sample about in the external polarizing magnetic field comprises spinning the sample about an axis substantially perpendicular to the polarizing field.

11. The method as claimed in claim 9 wherein the step of rapidly moving the sample about in the external polarizing magnetic field comprises stirring the sample.

References Cited in the file of this patent

UNITED STATES PATENTS

| Re. 23,950 | Bloch et al. | Feb. 22, 1955 |
| 2,351,944 | Engler | June 20, 1944 |
| 2,721,950 | Leviathal | Oct. 25, 1955 |

OTHER REFERENCES

Carr: Free Precession Techniques in Nuclear Magnetic Resonance, published December 15, 1952 in Harvard University Library (pages 52 to 56 relied on).

Anderson et al.: Physical Review, vol. 94, No. 2, Apr. 15, 1954, pp. 497–498.

Beams: Journal of Applied Physics, vol. 8, No. 12, pp. 795–806, December 1937.

Volkoff et al.: Canadian Journal of Physics, vol. 30, No. 3, pp. 270–289, 1952.

UNITED STATES PATENT OFFICE
CERTIFICATION OF CORRECTION

Patent No. 2,960,649                           November 15, 1960

Felix Bloch

It is hereby certified that error appears in the above numbered patent requiring correction and that the said Letters Patent should read as corrected below.

Column 5, line 7, for "with" read -- width --.

Signed and sealed this 8th day of August 1961.

(SEAL)
Attest:

ERNEST W. SWIDER
Attesting Officer

DAVID L. LADD
Commissioner of Patents